United States Patent
Yeiser et al.

(10) Patent No.: US 12,018,775 B2
(45) Date of Patent: Jun. 25, 2024

(54) KINK-RESISTANT HOSE

(71) Applicant: Swan Products, LLC, Sandy Springs, GA (US)

(72) Inventors: John Yeiser, Santee, CA (US); Tim O'Connor, Eden, NY (US); Jose Rossi, Mississauga (CA); Erick Williams, Roswell, GA (US)

(73) Assignee: Swan Products, LLC, Sandy Springs, GA (US)

(*) Notice: Subject to any disclaimer, the term of this patent is extended or adjusted under 35 U.S.C. 154(b) by 110 days.

(21) Appl. No.: 17/413,663

(22) PCT Filed: Feb. 26, 2021

(86) PCT No.: PCT/US2021/019974
§ 371 (c)(1),
(2) Date: Jun. 14, 2021

(87) PCT Pub. No.: WO2021/174047
PCT Pub. Date: Sep. 2, 2021

(65) Prior Publication Data
US 2023/0358346 A1    Nov. 9, 2023

Related U.S. Application Data

(60) Provisional application No. 62/982,687, filed on Feb. 27, 2020.

(51) Int. Cl.
*F16L 11/10*    (2006.01)
*F16L 11/12*    (2006.01)
(Continued)

(52) U.S. Cl.
CPC .............. *F16L 11/10* (2013.01); *F16L 11/12* (2013.01); *F16L 11/22* (2013.01); *F16L 57/02* (2013.01)

(58) Field of Classification Search
CPC .. F16L 11/10; F16L 11/12; F16L 11/22; F16L 57/02
(Continued)

(56) References Cited

U.S. PATENT DOCUMENTS 4,529,009 A    7/1985  Horner et al.
5,746,255 A *  5/1998  Walsh ...................... E03B 7/12
                                                        138/28
(Continued)

FOREIGN PATENT DOCUMENTS

CN    102187138 A    9/2011
CN    103635224 A    3/2014
(Continued)

OTHER PUBLICATIONS

International Search Report and Written Opinion in related international application PCT/US2021/019974 issued on May 4, 2021.
(Continued)

*Primary Examiner* — Patrick F Brinson
(74) *Attorney, Agent, or Firm* — Polsinelli, P.C.

(57) ABSTRACT

A kink-resistant hose comprises a tubing and at least one anti-kinking member disposed within an interior volume of the tubing. The outer diameter of the anti-kinking member is less than the inner diameter of the tubing, wherein the anti-kinking member and the tubing are coextruded such that the anti-kinking member is free-floating within the interior volume of the tubing. A cross-sectional area of the anti-kinking member is less than the area of a circle with diameter equal to the maximal diameter of the anti-kinking member. The anti-kinking member thereby defines propped open flow channels, extending radially between an outer surface of the anti-kinking member and an inner surface of the tubing at a kink point, for conveying fluid through a kink in the tubing. A restraint mechanism located in at least the
(Continued)

first distal end of the tubing restrains longitudinal movement of the anti-kinking member through the tubing.

19 Claims, 8 Drawing Sheets

(51) Int. Cl.
*F16L 11/22* (2006.01)
*F16L 57/02* (2006.01)

(58) Field of Classification Search
USPC .................................. 138/108, 153, 172, 118
See application file for complete search history.

(56) References Cited

U.S. PATENT DOCUMENTS

| | | | | |
|---|---|---|---|---|
| 7,077,165 | B2* | 7/2006 | Takasaki | F16L 9/19 |
| | | | | 285/123.3 |
| 7,918,247 | B2* | 4/2011 | Coleman | F16L 57/02 |
| | | | | 138/121 |
| 2006/0112997 | A1* | 6/2006 | Fish | C08G 69/36 |
| | | | | 138/116 |
| 2014/0261841 | A1 | 9/2014 | Orow et al. | |
| 2016/0083243 | A1* | 3/2016 | Larsson | F16L 11/22 |
| | | | | 141/234 |
| 2016/0317777 | A1 | 11/2016 | Kerber et al. | |
| 2018/0306353 | A1* | 10/2018 | Caplan | F16L 11/12 |

FOREIGN PATENT DOCUMENTS

| | | |
|---|---|---|
| CN | 105378360 A | 3/2016 |
| CN | 105518363 A | 4/2016 |
| DE | 102007056169 A1 | 5/2009 |
| DE | 102014209599 A1 | 11/2015 |
| WO | 1997/31213 A1 | 8/1997 |

OTHER PUBLICATIONS

Office Action in related CN application 20218000203304 issued on Aug. 16, 2022 with English translation.
Examination Report in related TW Application 110107109 issued on Jul. 26, 2022 with English translation.
Communication Pursuant to Rule 161(1) and 162 (office action) in related EP Application issued on Aug. 25, 2021.
Communication Under Rule 71(3) (intention to grant) in related EP Application issued on Jul. 20, 2022.

* cited by examiner

KINK-RESISTANT HOSE

CROSS-REFERENCE TO RELATED APPLICATIONS

This application claims priority to U.S. Provisional Patent Application No. 62/982,687, filed Feb. 27, 2020 and entitled "KINK-RESISTANT HOSE", the disclosure of which is herein incorporated by reference in its entirety.

TECHNICAL FIELD

The present technology pertains to tubings and hoses, and more specifically to improved kink resistance thereof.

BACKGROUND

Kinking and other flow impingements are common problems experienced by users of hoses and tubings to convey fluids, particularly in the case of relatively low fluid pressurizations and over relatively long distances. For example, kinks are one of the main nuisances experienced by users of garden hoses to convey water from a tap or spigot, such as those found on the sides of residential homes and commercial properties around the world.

Kinking occurs when a hose is doubled over or twisted, such that opposing sides of the hose's cylindrical inner walls are folded in upon themselves. As a consequence of this fold, the two opposing faces of the hose's inner wall make contact with one another and reduce or entirely inhibit the flow of fluid through the hose. For example, kinking is often experienced when a user attempts to uncoil or otherwise straighten out a hose, such as a garden hose that has been coiled for storage while not in use. Kinking is also particularly common in newly purchased hoses that have been stored coiled configuration since their manufacture, and is a longstanding frustration experienced by garden hose owners. When one or more kinks have formed in a hose, fluid flow will not be restored to its original rate or capacity until the kink is resolved—typically requiring the user to manually unfold the hose at the location of the kink(s).

Existing solutions typically take the form of external reinforcements made to the outer layer(s) of a garden hose, including stiffening and strengthening elements to resist torsional and/or bending forces that might otherwise cause kinking in the hose. However, such external reinforcements typically render the entire hose stiffer, less pliable, and generally make it more difficult for users to maneuver or manipulate the hose around obstacles, e.g., as might commonly be experienced as a user drags a hose from a spigot on the side of his house to water his lawn or garden. Moreover, although existing solutions may provide resistance to kink formation, when a kink does form, the same stiffening elements might make it more difficult for the user to subsequently unkink the hose. Accordingly, it would be desirable to provide a kink-resistant hose without applying external reinforcements or sacrificing the maneuverability and handling characteristics of the hose as a whole.

SUMMARY OF THE INVENTION

In accordance with one embodiment of the invention, a hose is provided comprising: a tubing having a first distal end and a second distal end; an anti-kinking member disposed within the tubing, the anti-kinking member having an outer diameter that is smaller than the inner diameter of the tubing, wherein the anti-kinking member and the tubing are coextruded such that the anti-kinking member is free-floating within an interior volume of the tubing; and a restraint mechanism located at the first distal end of the tubing, wherein the restraint mechanism restrains longitudinal movement of the anti-kinking member through the first distal end of the tubing.

In an embodiment, the anti-kinking member has a first maximal diameter; a cross-sectional area of the anti-kinking member is less than the area of a circle having a diameter equal to the first maximal diameter; and the anti-kinking member defines one or more propped open flow channels for conveying fluid through a kink in the tubing.

In an embodiment, the sum of the cross-sectional area of the one or more propped open flow channels and the cross-sectional area of the anti-kinking member is greater than or equal to the area of the circle having a diameter equal to the first maximal diameter.

In an embodiment, the tubing comprises a first material and the anti-kinking member comprises a second material that is different than the first material.

In an embodiment, the first material and the second material are incompatible coextrusion materials for bonding or adhesion.

In an embodiment, the first material and the second material comprise one or more of: polyvinyl chloride (PVC), thermoplastic elastomer (TPE), thermoplastic polyurethane (TPU), nylon, polyethylene (PE), and synthetic and natural rubber.

In an embodiment, the anti-kinking member is cross-shaped or 'X'-shaped in cross section.

In an embodiment, the anti-kinking member is circular, elliptical, square, rectangular, triangular, or polygonal shaped in cross-section.

In an embodiment, the anti-kinking member comprises a hollow cylindrical tubing having an outer diameter less than 25% of the inner diameter of the hollow tubing.

In an embodiment, the hose further comprises a second anti-kinking member disposed within the interior volume of the tubing, wherein a cumulative cross-sectional area of the anti-kinking members is less than 10% of the cross-sectional area of the interior volume of the tubing.

In an embodiment, the restraint mechanism comprises a circular screen member disposed within the first distal end of the hollow tubing.

In an embodiment, the circular screen member has an outer diameter equal to an inner diameter of the tubing at the first distal end; and the circular screen member is rigidly affixed within the inner volume of the tubing at the first distal end.

In an embodiment, the first distal end of the tubing is a fluid egress point of the hose.

In an embodiment, the first distal end of the tubing terminates in a male-threaded fitting.

In an embodiment, the second distal end of the tubing terminates in a female-threaded fitting.

In an embodiment, the hose further comprises a second restraint mechanism located at the second distal end of the tubing, wherein the second restraint mechanism restrains longitudinal movement of the anti-kinking member through the second distal end of the tubing.

In an embodiment, the anti-kinking member is fixedly coupled to the circular screen member to restrain longitudinal movement of the anti-kinking member relative to the circular screen member and the tubing.

In an embodiment, the circular screen member comprises a plurality of interstices and the anti-kinking member is fixedly coupled to the circular screen member by a press fit with one or more of the interstices.

In an embodiment, the restraint mechanism comprises an end-loop formed from a terminal portion of the anti-kinking member located within the first distal end of the tubing, such that the end-loop forms first and second contact points with an inner surface of the tubing, where the first contact point is located opposite from the second contact point.

In an embodiment, the hose further comprises a friction-promoting coating applied to the end-loop of the anti-kinking member, wherein the friction-promoting coating increases a frictional force between the inner surface of the tubing and the first and second contact points of the end-loop.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
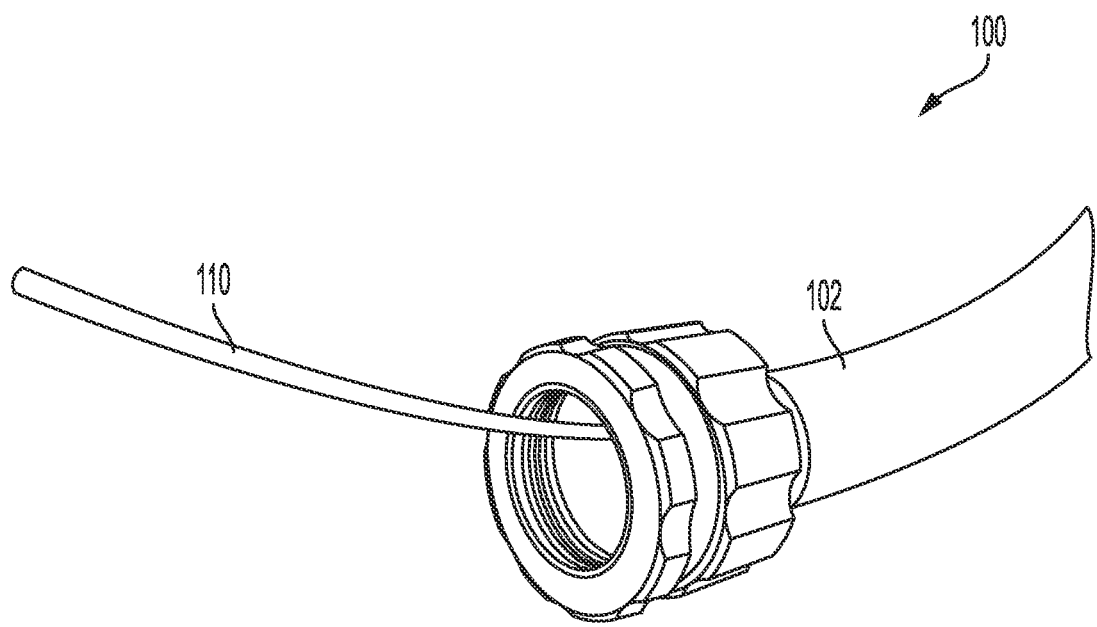
FIG. 1A depicts a perspective view of an anti-kinking member partially contained within the interior volume of a hose tubing.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

FIG. 1A depicts an example embodiment of a hose 100, consisting of a tubing 102 and an anti-kinking member 110 (interchangeably referred to herein as an anti-kinking "filament", "rib", or "rib member") disposed within tubing 102. As will be explained in greater depth below, anti-kinking member 110 is unattached along the interior wall of tubing 102, or at least unattached between the portion of the interior wall of tubing 102 between its two end connectors, such that the anti-kinking member is allowed to float within the fluid flow stream during normal (i.e., unkinked) operation of the hose 100. When a kink develops, anti-kinking member 110 is pressed into contact with the opposing faces of the interior wall of tubing 102 at the kink point, and thereby creates one or more open spaces/channels that allow fluid to continue to flow past the kink point. In other words, anti-kinking member 110 prevents or mitigates the characteristic folding-in action of the tubing walls that would otherwise define a kink.

Anti-kinking member 110 can be of substantially the same length as tubing 102 in order to provide kink protection along the full extent of tubing 102 and/or hose 100. For example, in a scenario in which hose 100 has a male end and a female end, anti-kinking member 110 can have a length such that the anti-kinking member 110 spans from, at its first distal end, the attachment point of the female ferrule to tubing 102 to, at its second distal end, the attachment point of the male ferrule to tubing 102.

Although anti-kinking member 110 may be free-floating or otherwise unattached to the inner walls of tubing 102, one or more coupling mechanisms or restraint elements (not shown; see, e.g., FIGS. 2A-4B) can be utilized to contain the anti-kinking member 110 within the interior volume of tubing 102 and/or restrain longitudinal movement of one or both distal ends of anti-kinking member 110 with respect to tubing 102. These restraint elements can be provided at one or both open ends of tubing 102, e.g., at the male end and/or the female end, as will be explained in greater depth below.

It is noted that, while FIG. 1A illustrates hose 100 as being of a single-layer construction (where the interior surface of tubing 102 is in contact with the fluid being conveyed through hose 100 and the exterior surface of tubing 102 is in contact with the environment in which hose 100 is placed), it is also contemplated that multi-layer hose constructions may be utilized without departing from the scope of the present disclosure. In the case of a multi-layer or jacketed hose construction, the tubing 102 in which the anti-kinking member 110 is contained will be the innermost or "core" layer of the multi-layer hose. For clarity of explanation, the subsequent description makes reference to the example scenario in which hose 100 is a single-layer or single-piece construction, i.e., consisting of just tubing 102, but is not intended to be limiting in terms of single-layer or multi-layer hose construction.

Moreover, although the following figures and description make reference to an example configuration in which a single anti-kinking member 110 is disposed within the interior volume of tubing 102, it is further contemplated that multiple anti-kinking members may be utilized without departing from the scope of the present disclosure. The multiple anti-kinking members can have a cumulative cross-sectional area that approximates the cross-sectional area of the single anti-kinking member 110 or may have a cumulative cross-sectional area that exceeds the cross-sectional area of the single anti-kinking member 110.

In some embodiments, anti-kinking member 110 is coextruded with tubing 102, in which case anti-kinking member 110 and tubing 102 can be selected to be non-like materials that do not bond, attach, or otherwise adhere to one another during the coextrusion process. For example, if tubing 102 is formed from polyvinyl chloride (PVC), then anti-kinking member 110 might be polyethylene (PE), which will not adhere to the PVC material of tubing 102. More generally, tubing 102 and anti-kinking member 110 can be selected from one or more of PVC, thermoplastic elastomer (TPE), thermoplastic polyurethane (TPU), nylon, PE, and synthetic and natural rubber, where in some embodiments anti-kinking member 110 and tubing 102 are selected to be non-like materials for coextrusion.

A coextrusion die for coextruding tubing 102 and anti-kinking member 110 can be configured such that anti-kinking member 110 is extruded at or along the inner wall of tubing 102, although it is noted that the non-like material selection between the two components ensures that anti-kinking member 110 does not bond or attach to tubing 102 even if anti-kinking member 110 is extruded along the inner wall of tubing 102. In some embodiments, anti-kinking member 110 can be extruded away from the inner wall or circumference of tubing 102, and for example might be extruded at the center of the circular cross-section of tubing 102. A coextrusion die that positions anti-kinking member 110 away from the inner walls of tubing 102 can assist in maintaining the free-floating configuration between anti-kinking member 110 and tubing 102, as both components are allowed to cool for a period of time before coming into contact with one another after being pushed through the coextrusion die. In this manner, anti-kinking member 110 and tubing 102 can be extruded without the use of non-like materials to form the two components. In some embodiments, without departing from the scope of the present disclosure, similar materials can be used to coextrude tubing 102 and anti-kinking member 110, with the above-described coextrusion configuration maintaining the anti-kinking member 110 as separate from tubing 102 and otherwise neither attached nor adhered to the inner wall of tubing 102.

In some embodiments, rather than employing a coextrusion process, anti-kinking member 110 can be manufactured separately from tubing 102 and inserted or disposed within tubing 102 as an additional manufacturing step. For example, a separately manufactured anti-kinking member 110 could be inserted into tubing 102, prior to or concurrent with attaching the male and/or female ferrule(s) to tubing 102. It is also contemplated that anti-kinking member 110 can be retrofit into a hose or tubing to which ferrules or end fittings have already been attached. In order to provide anti-kinking member 110 within the interior volume defined by tubing 102, anti-kinking member 110 can be inserted, pushed, pulled, or some combination of the three. For example, a wire or rope-like member can be temporarily attached to anti-kinking member 110 and manipulated to pull the anti-kinking member 110 through tubing 102 until anti-kinking member 110 is fully contained within the inner volume of tubing 102. As another example, a cap or sail-like mechanism (e.g., an air dam cap) can be attached to a first distal end of anti-kinking member 110 in order to increase the cross-sectional area upon which airflow can be applied in order to push the anti-kinking member 110 into position. In particular, a cap can be attached to the first distal end of anti-kinking member 110, positioned in or at the threshold of the first open end of tubing 102, and compressed air can then be used to blow anti-kinking member 110 into position, i.e. with both its first and second distal ends fully contained within the inner volume of tubing 102. The cap can then be removed from anti-kinking member 110 after it has been blown or pushed into position.

Regardless of whether anti-kinking member 110 is coextruded with tubing 102, or separately positioned within the interior volume of tubing 102, in operation, anti-kinking member 110 holds apart the inner walls of tubing 102 at a kink point and allows fluid to pass through the kink. In other words, anti-kinking member 110 inhibits tubing 102 from fully closing and shutting off the flow of fluid. By allowing fluid to pass through the kink point, anti-kinking member 110 allows the downstream portion of tubing 102 to continue to fill with fluid and maintain pressurization throughout the entire interior volume of tubing 102, thereby eliminating the kink or at the least reducing the severity of its inconvenient effects.

Figure 1B:
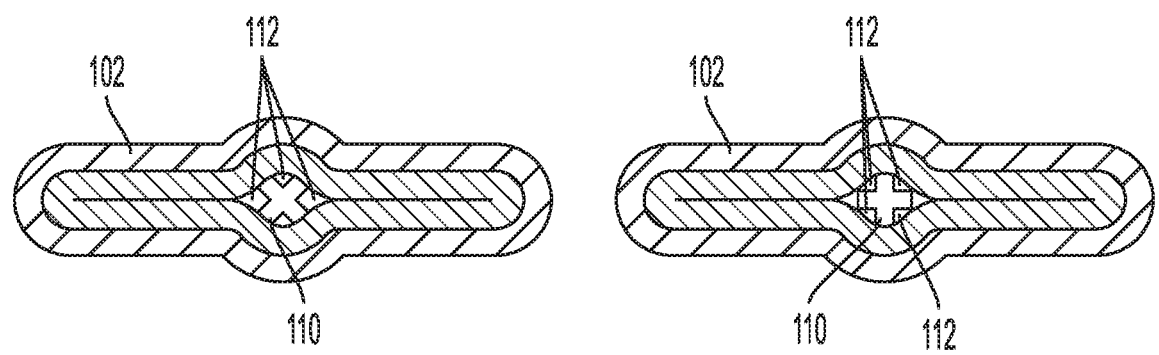
FIG. 1B depicts a cross-sectional view of an anti-kinking member creating open fluid flow channels through a kink in a hose tubing.

In particular, FIG. 1B depicts a cross-sectional view (i.e., looking down the longitudinal axis or bore) of tubing 102, with the cross-sectional plane taken radially at a kink point that is being held open by anti-kinking member 110. As explained previously, in a traditional kink (i.e., a kink forming in a hose or tubing without the presently disclosed anti-kinking member 110), the opposing sides of the interior wall of tubing 102 would be pressed together, forming a contact patch that spans the inner diameter of the hose and restricts or prevents fluid flow along the longitudinal axis. Anti-kinking member 110 prevents such an occurrence by holding apart the opposing interior sidewalls of tubing 102, creating one or more propped open channels 112 that allow fluid to pass through the kink. The size and shape of the propped open channels 112 can vary depending on the geometry of anti-kinking member 110, as will be described in greater depth below. However, a tradeoff is present between having a larger diameter anti-kinking member 110 (and hence larger propped open channels 112 that allow fluid flow through a kink) and the overall flow rate of hose 100; the cross-sectional area that is occupied at all times by anti-kinking member 110 is space that would otherwise be filled with fluid. Therefore, in some embodiments anti-kinking member 110 is chosen to optimize between a desired flow rate through a kink and a desired flow rate when the hose is in an un-kinked state. In some embodiments, anti-kinking member 110 can be chosen such that its cross-sectional area is no more than 10% of the cross-sectional area of tubing 102 and/or such that the flow rate reduction when the hose is in an un-kinked state does not exceed 10%, although it is appreciated that other ratios of cross-sectional area and percentages of flow rate reductions may be utilized without departing from the scope of the present disclosure.

In some embodiments, where the internal diameter of tubing 102 is 0.5 inches, the diameter of anti-kinking member 110 can be selected to be approximately 0.08" in diameter. For an anti-kinking member that has a cross-section that is square, this 0.08" diameter would result in only a 3% reduction of total flow area available through the half-inch tubing (i.e., a 3% reduction of flow area in comparison to an unimpeded half-inch tubing without an anti-kinking member disposed within its interior volume). For an anti-kinking member having an 'X' shaped cross section, such as anti-kinking member 110 as shown in FIG. 1B, this 0.08" diameter would result in a flow reduction through a half-inch tubing on the order of only 1.5%.

In general, the material used to form anti-kinking member 110 is selected not only to be one suitable for coextrusion with tubing 102, but also one that provides sufficient rigidity such that anti-kinking member 110 is able to hold tubing 102 open at one or more kink points without significantly deforming or collapsing down along the folded tubing wall portion of the kink. In some embodiments, for larger diameters of anti-kinking member 110, a corresponding increase in rigidity can be provided. This increase in rigidity can be provided via a change in material selection or composition, a change in the geometric design of anti-kinking member 110, or some combination of the two.

For example, as depicted in FIG. 1B, anti-kinking member 110 has an 'X' or cross-shaped cross-sectional area. This design creates four points of contact between the four "arms" of anti-kinking member 110 and the inner wall of tubing 102 and creates the four propped-open channels 112. As the diameter of anti-kinking member 110 increases, so to do the length of the "arms". This increases the bending moment experienced by anti-kinking member 110 when it is located at or in a kink point of the tubing 102. Accordingly, geometric modifications can be made to allow anti-kinking member 110 to better resist any bending moments and other deformation forces acting at the kink point. For example, the individual "arms" of anti-kinking member 110 can be thickened, and/or a more rigid material such as PVC or nylon can be used to form anti-kinking member 110.

In the illustrated 'X' shaped configuration, the use of such arms helps minimize the surface area of the contact patch between anti-kinking member 110 and the inner wall of tubing 102. By minimizing the contact patch surface area, it can be easier to maximize water flow through the kink, i.e., because water can only flow past anti-kinking member 110 and through the kink in tubing 102 via the open spaces 112 in which anti-kinking member 110 does not make any contact with the inner wall of tubing 102.

However, it is appreciated that the cross-sectional design of anti-kinking member 110 as shown in FIG. 1B is for illustrative purposes only, and a variety of other cross-sectional shapes, designs and configurations of anti-kinking member 110. For example, anti-kinking member 110 can be circular, elliptical, square, rectangular, triangular, polygonal etc. in its cross-sectional area without departing from the scope of the present disclosure. In some embodiments, anti-kinking member 110 can be hollow in its construction (not shown), such that the hollow anti-kinking member has both an exterior wall surface and an interior wall surface that are exposed to the fluid flow within tubing 102. In instances in which anti-kinking member 110 is hollow, a more rigid construction and/or material selection can be needed in order to prevent the hollow anti-kinking member 110 itself from kinking or having its inner walls folded shut at the kink point of the larger tubing 102. Additionally, although only a single anti-kinking member 110 is illustrated, it is also possible to employ multiple anti-kinking members, whether having similar or dissimilar cross-sections and/or material properties, within a single tubing 102, without departing from the scope of the present disclosure.

Figure 2A:
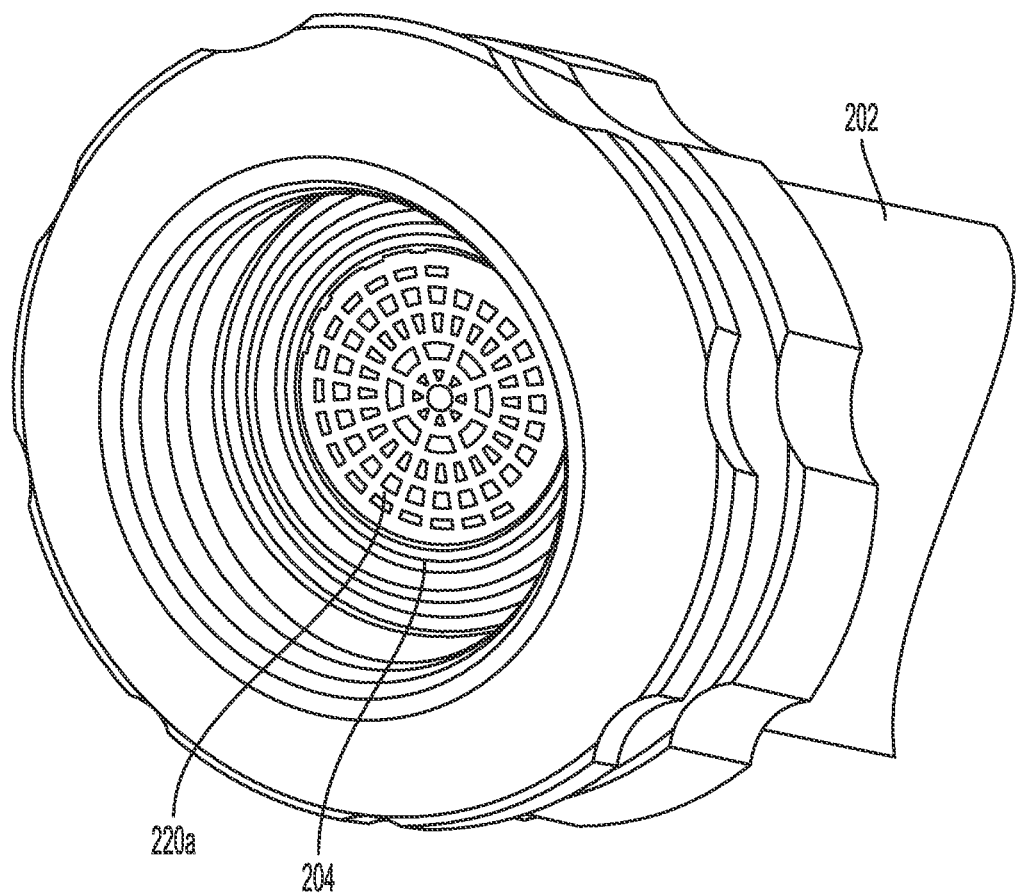
FIG. 2A depicts an example embodiment of a screened coupling mechanism to restrain longitudinal movement of an anti-kinking member with respect to a hose tubing.
Figure 2B:
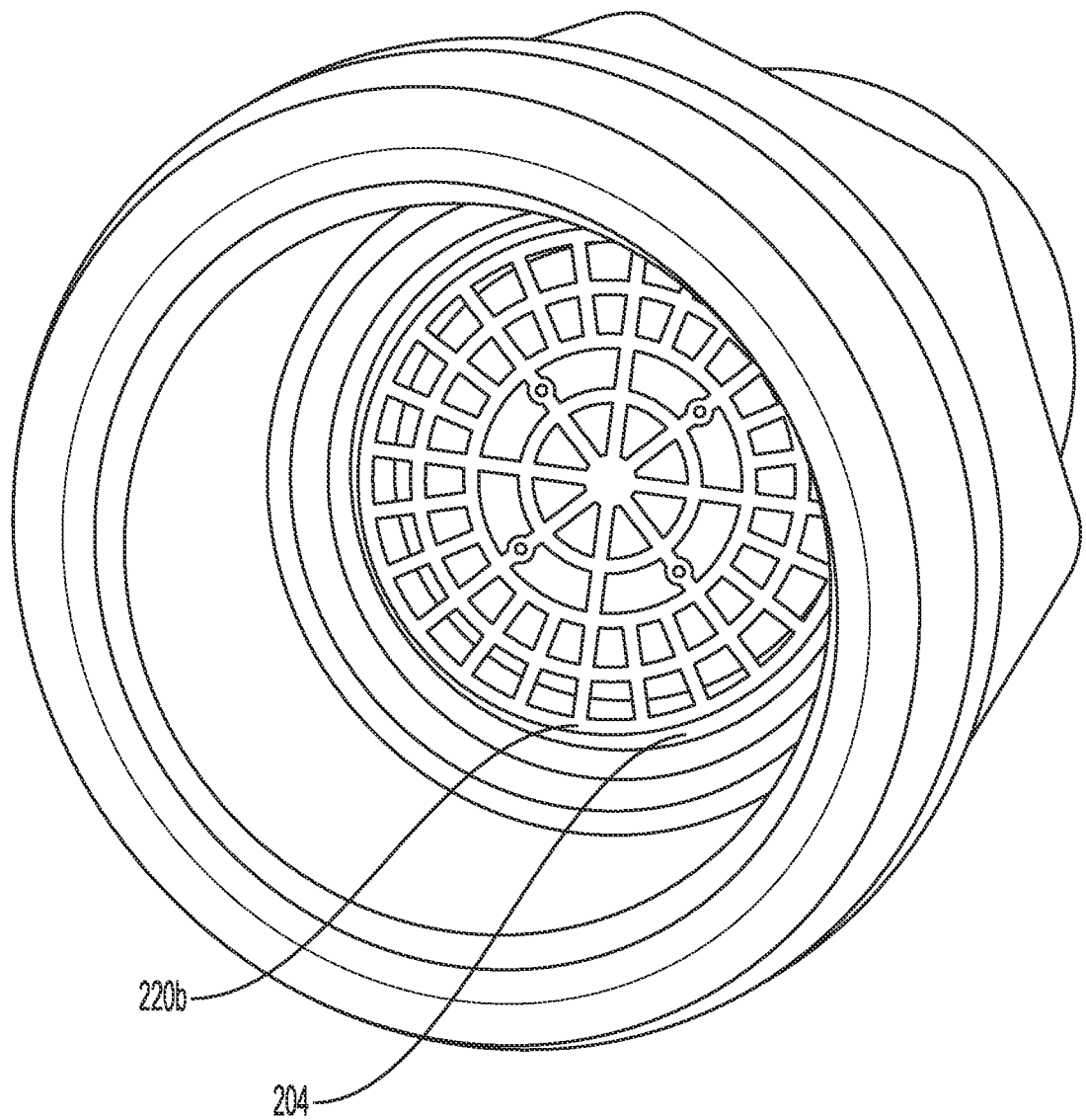
FIG. 2B depicts an example embodiment of a screened coupling mechanism to restrain longitudinal movement of an anti-kinking member with respect to a hose tubing.
Figure 2C:
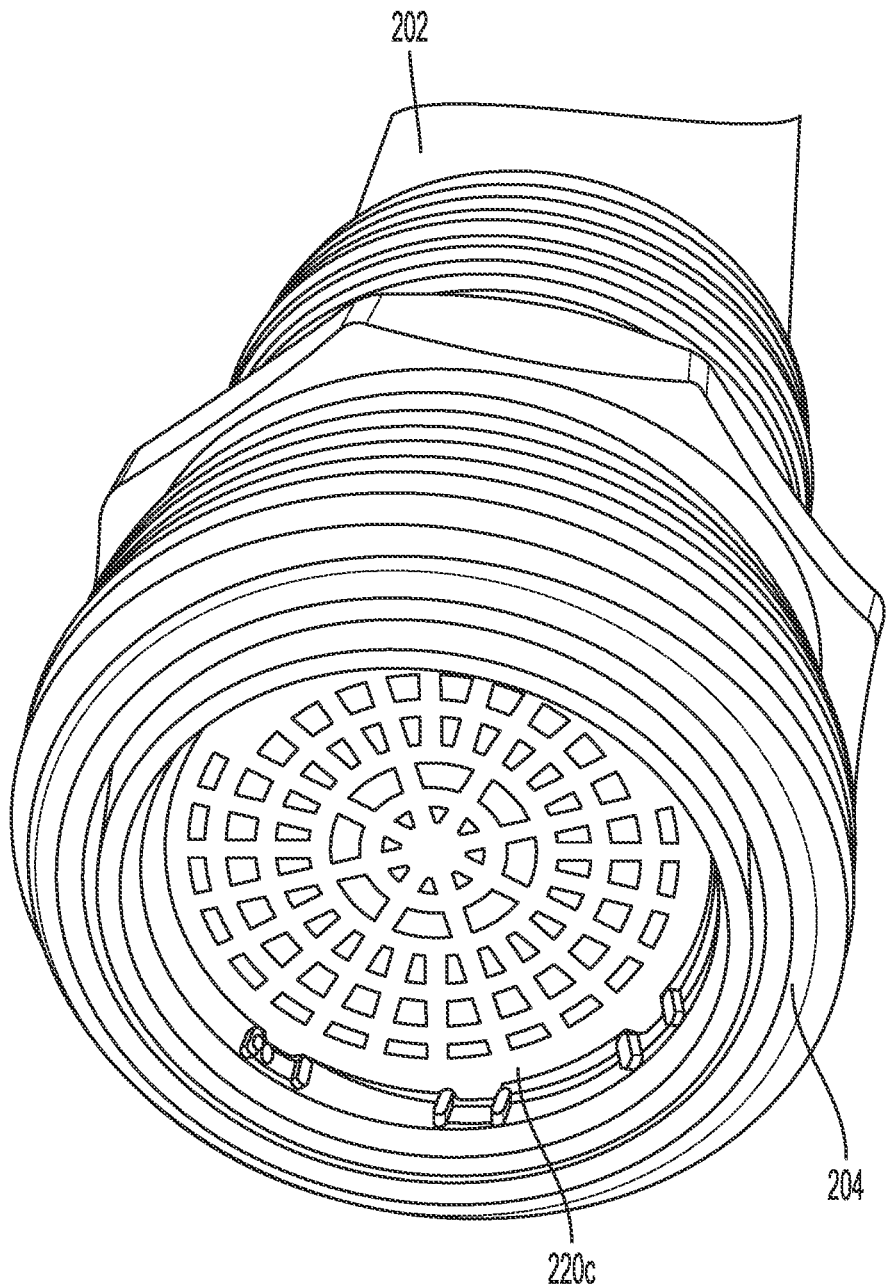
FIG. 2C depicts an example embodiment of a screened coupling mechanism to restrain longitudinal movement of an anti-kinking member with respect to a hose tubing.

In order to secure or otherwise contain the anti-kinking member(s) 110 within the interior volume defined by tubing 102, coupling mechanisms can be provided at one or more of the open ends (i.e., the male and female ends) of a hose tubing 102. For example, FIGS. 2A-C illustrate examples of screened coupling mechanisms 220a-c installed into the open end of a tubing 202, e.g., within a ferrule 204 or other end-connector of the hose tubing. The screened coupling mechanisms 220a-c can be installed onto tubing 202 with anti-kinking member 110 already located within the interior volume of the anti-kinking member. Once installed, the screens 220a-c prevent anti-kinking member 110 from becoming dislodged or removed from the interior volume of tubing 202 but generally do not restrict the free movement of the anti-kinking member with respect to the inner wall portion of the tubing.

For example, the screens 220a-c can be installed into a ferrule 204 of tubing 202 in order to block the passage of anti-kinking member 110 through the open end of the ferrule 204/tubing 202. The screens 220a-c can be provided with various arrangements and patterns of openings, with each opening generally sized so as to prevent the passage of anti-kinking member 110. In other words, the maximal extent or width of a given opening on one of the screens 220a-c may be sized to be smaller than the width of anti-kinking member 110. The screens 220a-c can be formed from plastic or metal, able to withstand exposure to the one or more fluids that will be conveyed through the tubing 202. The outer circumference of screens 220a-c can contain one or more tabs or flanges which allow for a snap-in engagement with the open end of the ferrule 204/tubing 202. Advantageously, the inner wall portion of ferrule 204 or another hose end coupling often contains a pre-existing groove into which the tabs along the outer circumference of screens 220a-c can engage with via the aforementioned snap-in fit, as can be seen in FIGS. 2A-C via the tabbed engagement of screens 220a-c with the grooved interior surface of the metal ferrule 204 attached to the tubing 202. In some embodiments, a press-fit, e.g., via a small insertion press, can be used to seat the screens 220a-c within the open end of tubing 202, although other attachment techniques including the use of adhesives and fasteners may be utilized without departing from the scope of the present disclosure.

In some embodiments, a screen such as the screened coupling mechanisms 220a-c can be installed on both ends of tubing 202, e.g., one screen in the open end of the male ferrule and one screen at the open end of the female ferrule. The provision of a screen on both open ends of tubing 202 can help prevent accidental removal of anti-kinking member 100 as may occur when only one end of tubing 202 is screened, whether by a careless user who inadvertently allows the anti-kinking member to fall out of the non-screened end or by a curious user who intentionally pulls the anti-kinking member out of the non-screened end. Additionally, providing a screen such as screens 220a-c on both open ends of tubing 202 can help improve durability and longevity by eliminating the risk of anti-kinking member 110 migrating out of the non-screened end of the tubing after multiple cycles of being used, coiled, and stored.

However, hoses and tubings have both male and female ends are typically used in a consistent manner, wherein the female end is connected to a spigot or other pressurized fluid source and the male end is connected a nozzle, an end accessory, or otherwise used as the discharge point for fluid conveyed through the hose or tubing. Accordingly, in some embodiments a screened coupling mechanism might be installed only in the male end of the tubing. When the tubing is connected to a water spigot, for example, water will flow only from the female end to the male end of the tubing, applying a force that urges the anti-kinking member 110 in the same direction. With a screen installed at the male end/ferrule of the tubing, the anti-kinking member 110 is contained and prevented from exiting the interior volume of the tubing during operation. When the spigot is turned off, water flow through the tubing ceases and the force urging the anti-kinking member 110 out of the tubing is no longer present.

Where the above configuration uses one of the screens 220a-c to block the anti-kinking member at the male (discharge) end of the tubing 202, in one embodiment, one of the screens 220a-c can be configured to instead hold the anti-kinking member 110 in place at the female (intake) end of tubing 202. More particularly, the anti-kinking member 110 and the screen can be attached or otherwise bonded to one another to longitudinally fix the anti-kinking member 110 in position at its first distal end, while allowing the second distal end of the anti-kinking member to move within the interior volume of tubing 202 (subject, still, to the movement constraint imposed by the attachment to screen 220 made at the first distal end of the anti-kinking member).

For example, anti-kinking member 110 could be press fit through a grid opening of the screen 220a-c such that frictional forces hold the anti-kinking member in place and prevent its migration down the tubing 202, i.e. in the direction of fluid flow from the female end to the male end. For increased coupling strength, the distal end of anti-kinking member 110 could be passed through the screen 220a-c at least twice—the first time running from the interior of tubing 202 to the exterior, and the second time running from the exterior of tubing 202 back to the interior. Such a configuration provides at least two points of contact (one at each opening on the screen 220a-c through which the anti-kinking member 110 is passed/threaded through).

In some embodiments, rather than being press fit through an opening of screen 220a-c that is smaller than its maximal diameter, anti-kinking member 110 could be passed through an opening of screen 220a-c that is larger than its own maximal diameter, and then permanently fixed in place by deforming the screen opening around the outer surface of the anti-kinking member. For example, the screen opening could be melted or compressed about anti-kinking member 110 such that its longitudinal movement with respect to tubing 202 is inhibited. In some embodiments, a glue or adhesive could be used to secure the distal end of anti-kinking member 110 to the screen 220a-c, either through one or more openings of the screen or directly to the body of screen 220a-c without passing through the one or more screen openings. It is further contemplated that a clip element or other fastener can be utilized to secure anti-kinking member 110 to the screen 220a-c after passing the distal end of the anti-kinking member through one or more of the screen openings.

In some embodiments, one of the screens 220a-c can be provided at both the male and female ends of tubing 202. Both screens might be designed to block anti-kinking member 110 from passing through the open ends of tubing 202, both screens might be designed to physically hold or restrain movement of anti-kinking member 110 in the longitudinal direction, or a combination of the two might be utilized. Given that fluid flow typically is from the female end to the male end, the screen at the female end of tubing 202 can be sized with larger openings than the screen at the male end of tubing 202, which can help avoid unnecessarily restricting the fluid flow through the tubing.

Figure 3:
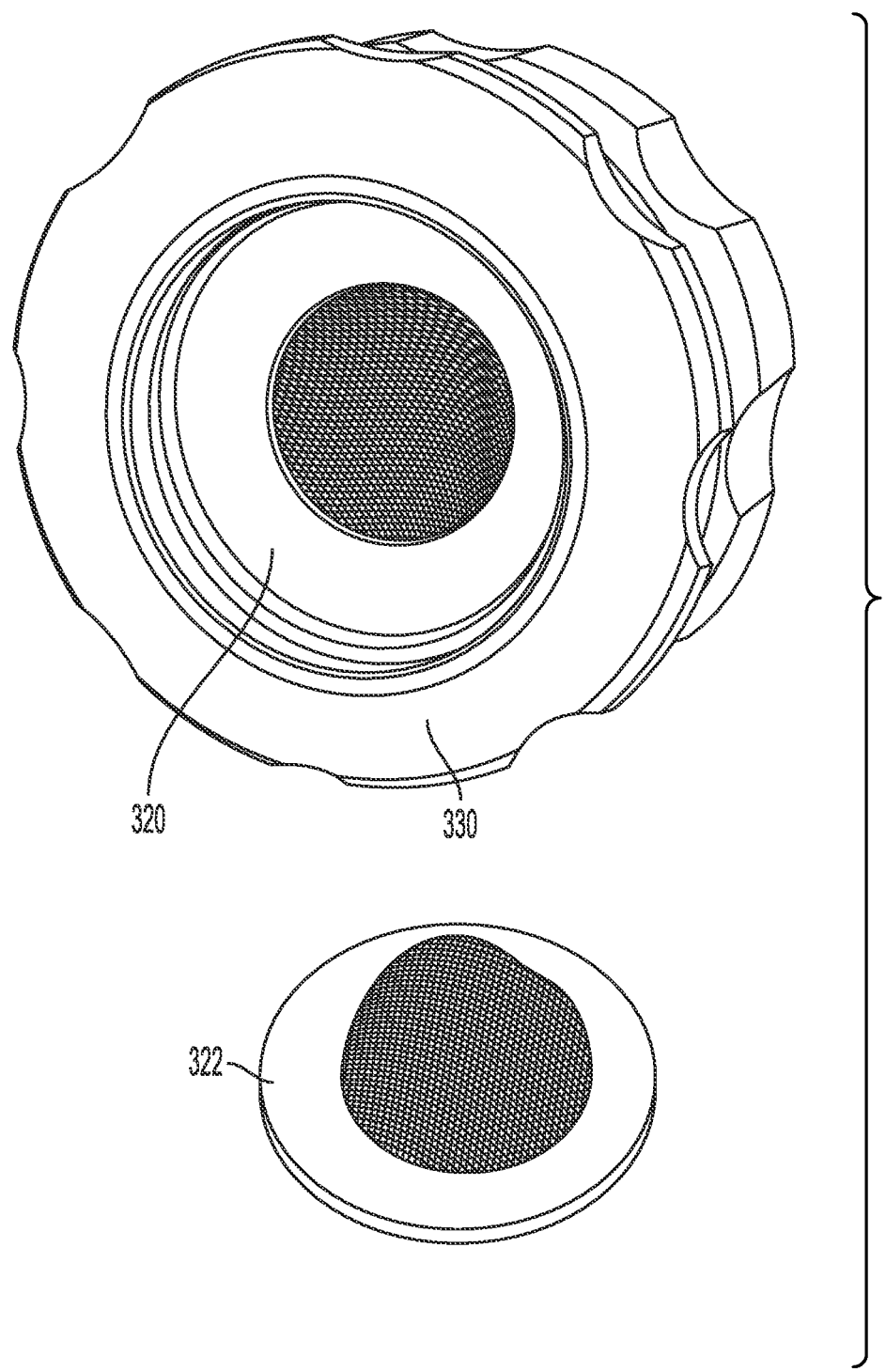
FIG. 3 depicts a perspective view of a washer screen coupling mechanism.

As depicted in FIG. 3, one or more of the end coupling mechanisms for containing an anti-kinking member within the interior volume of a hose or tubing can be provided by a screened washer. A first screened washer 320 is shown installed into the open end of a hose coupling 330, which itself can be installed over the open end or ferrule of a hose tubing 302 similar to the previously discussed tubings 102, 202. In some embodiments, the screened washer 320 can instead be installed into the open end or ferrule of tubing 302 itself, similar to the previously discussed screens 220a-c of FIGS. 2A-C.

Returning to FIG. 3, also shown is a second screened washer 322, in an uninstalled position. The screened washers 320, 322 consist of a rubber or flexible outer ring that is sized for the opening into which the screened washer is being installed, e.g. sized for the inner diameter of tubing 302 and/or the inner diameter of its ferrule or end connector. The inner portion of screened washers 320,322 consists of a mesh or grid arrangement, here comprising metal, although it is also contemplated that the inner portion of screened washers 320,322 could be formed from plastic, rubber, or other such materials. The principle of operation of the installed screened washer 320 is similar to that described previously with respect to the snap-fit or press-fit screens 220a-c, wherein the individual openings of the gridded inner portion of screened washer 320 are sized to prevent the passage of anti-kinking member 110 through the open end of tubing upon which screened washer 320 is installed, while still permitting water or other fluid(s) being carried through tubing 302 to pass through in a relatively free and unimpeded fashion.

Figure 4A:
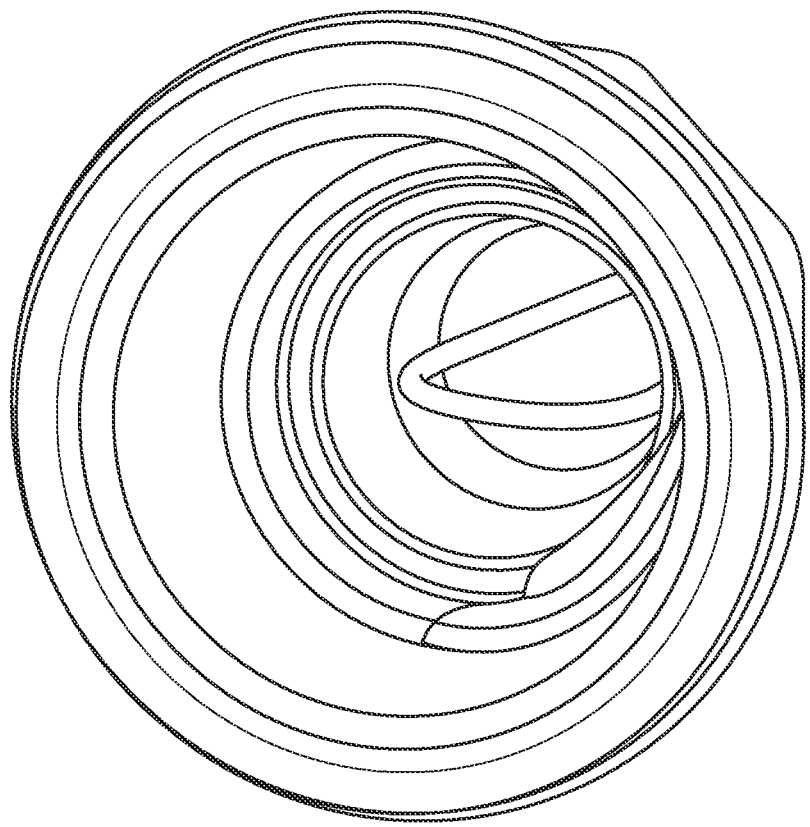
FIG. 4A depicts a perspective view of an anti-kinking member having an end-loop coupling mechanism to restrain longitudinal movement of the anti-kinking member.
Figure 4B:
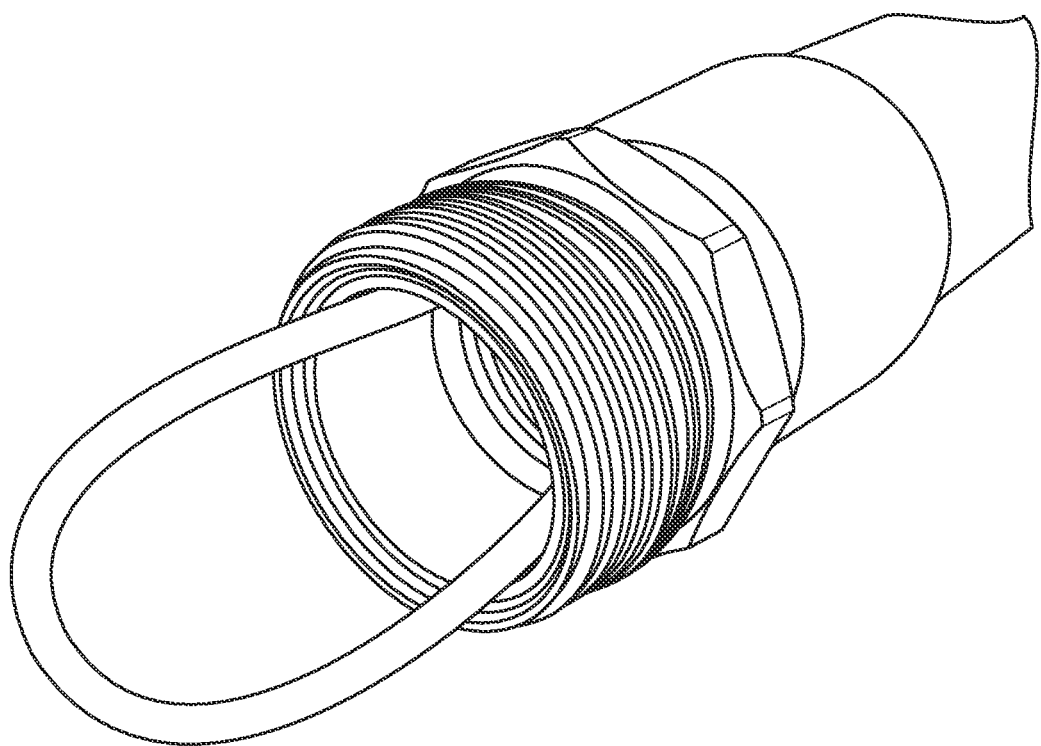
FIG. 4B depicts a perspective view of the anti-kinking member end-loop of FIG. 4A.

As depicted in FIGS. 4A-B, anti-kinking member 110 can be contained within the interior volume of a tubing 402 via frictional forces between the inner surface of tubing 402 and a loop formed from anti-kinking member 110 at its first distal end. FIG. 4A shows the end loop of the anti-kinking member in an installed position within the interior volume of the tubing. FIG. 4B shows a more complete view of the end loop of anti-kinking member 110, prior to its full installation within the interior volume of the tubing. In some embodiments, the end-loop may be formed at the distal end of anti-kinking member 110 such that it is approximately 1-2" in length, although other dimensions may also be utilized. As shown in FIG. 4A, the end-loop on the anti-kinking member can be pushed into the open end of tubing 402 until the end-loop is positioned at or below the coupling tail. The coupling tail is used to attach a coupling element or end connector to tubing 402 and is generally a tubular metal portion that is expanded from an initial outer diameter smaller than the inner diameter of the tubing to a final outer diameter that is equal to or slightly greater than the inner diameter of the tubing. At the terminal end of the expanded coupling tail, a ridge or lip is formed at the transition between the rubber surface of the tubing wall and the metal of the coupling tail. By installing the end-loop of the anti-kinking member below this coupling tail, as shown in FIG. 4A, an additional resistance point is provided to prevent longitudinal movement or drift of the anti-kinking member over time.

The frictional force generated between the end-loop of the anti-kinking member and the inner surface of tubing 402 depends in large part on the material selection and properties of the two components. In some instances, a friction promoting compound or coating may be applied to the end-loop in order to increase the frictional force and better secure the anti-kinking member 110 within the interior volume of tubing 402. The friction promoting compound or coating can be applied to the distal end of the anti-kinking member prior to it being formed into the end-loop or can be applied to the anti-kinking member after the end-loop has been formed. It is also possible that a friction promoting compound or adhesive agent can be applied to the inner surface of tubing 402, in the anticipated contact area between the tubing and the end-loop. In some embodiments, the anti-kinking member 110 can be secured with a combination of an end-loop on the anti-kinking member and the use of one of the screens 220*a-c*, 320.

What is claimed is:

1. A hose comprising:
a tubing having a first distal end and a second distal end;
an anti-kinking member disposed within the tubing, the anti-kinking member comprising a solid filament having an outer diameter that is smaller than the inner diameter of the tubing, wherein a fluid flow rate through the tubing is reduced corresponding to a cross-sectional area of the solid filament, and wherein the anti-kinking member and the tubing are coextruded such that the anti-kinking member is free-floating within an interior volume of the tubing; and
a restraint mechanism located at the first distal end of the tubing, wherein the restraint mechanism restrains longitudinal movement of the anti-kinking member through the first distal end of the tubing.

2. The hose of claim 1, wherein:
the anti-kinking member has a first maximal diameter;
a cross-sectional area of the anti-kinking member is less than the area of a circle having a diameter equal to the first maximal diameter; and
the anti-kinking member defines one or more propped open flow channels for conveying fluid through a kink in the tubing.

3. The hose of claim 2, wherein the sum of the cross-sectional area of the one or more propped open flow channels and the cross-sectional area of the anti-kinking member is greater than or equal to the area of the circle having a diameter equal to the first maximal diameter.

4. The hose of claim 1, wherein the tubing comprises a first material and the anti-kinking member comprises a second material that is different than the first material.

5. The hose of claim 4, wherein the first material and the second material are incompatible coextrusion materials for bonding or adhesion.

6. The hose of claim 4 wherein the first material and the second material comprise one or more of: polyvinyl chloride (PVC), thermoplastic elastomer (TPE), thermoplastic polyurethane (TPU), nylon, polyethylene (PE), and synthetic and natural rubber.

7. The hose of claim 1, wherein the anti-kinking member is cross-shaped or 'X'-shaped in cross section.

8. The hose of claim 1, wherein the anti-kinking member is circular, elliptical, square, rectangular, triangular, or polygonal shaped in cross-section.

9. The hose of claim 1, further comprising a second anti-kinking member disposed within the interior volume of the tubing, wherein a cumulative cross-sectional area of the anti-kinking members is less than 10% of the cross-sectional area of the interior volume of the tubing.

10. The hose of claim 1, wherein the restraint mechanism comprises a circular screen member disposed within the first distal end of the hollow tubing.

11. The hose of claim 10, wherein:
the circular screen member has an outer diameter equal to an inner diameter of the tubing at the first distal end; and
the circular screen member is rigidly affixed within the inner volume of the tubing at the first distal end.

12. The hose of claim 11, wherein the first distal end of the tubing is a fluid egress point of the hose.

13. The hose of claim 12, wherein the first distal end of the tubing terminates in a male-threaded fitting.

14. The hose of claim 13, wherein the second distal end of the tubing terminates in a female-threaded fitting.

15. The hose of claim 14, further comprising a second restraint mechanism located at the second distal end of the tubing, wherein the second restraint mechanism restrains longitudinal movement of the anti-kinking member through the second distal end of the tubing.

16. The hose of claim 10, wherein the anti-kinking member is fixedly coupled to the circular screen member to restrain longitudinal movement of the anti-kinking member relative to the circular screen member and the tubing.

17. The hose of claim 16, wherein the circular screen member comprises a plurality of interstices and the anti-kinking member is fixedly coupled to the circular screen member by a press fit with one or more of the interstices.

18. The hose of claim 1, wherein the restraint mechanism comprises an end-loop formed from a terminal portion of the anti-kinking member located within the first distal end of the tubing, such that the end-loop forms first and second contact points with an inner surface of the tubing, where the first contact point is located opposite from the second contact point.

19. The hose of claim 18, further comprising a friction-promoting coating applied to the end-loop of the anti-kinking member, wherein the friction-promoting coating increases a frictional force between the inner surface of the tubing and the first and second contact points of the end-loop.

* * * * *